(12) United States Patent
Chang et al.

(10) Patent No.: US 8,667,625 B2
(45) Date of Patent: Mar. 11, 2014

(54) CONNECTING STRUCTURE FOR A FAUCET

(75) Inventors: Weichi Chang, Taichung (TW); Gaoren Yao, Shen Zen (CN); Xiuliang Tan, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 385 days.

(21) Appl. No.: 13/209,401

(22) Filed: Aug. 13, 2011

(65) Prior Publication Data

US 2013/0039693 A1 Feb. 14, 2013

(51) Int. Cl.
*E03C 1/042* (2006.01)

(52) U.S. Cl.
USPC .............................................................. 4/695

(58) Field of Classification Search
USPC .............................................................. 4/695
See application file for complete search history.

(56) References Cited

U.S. PATENT DOCUMENTS

| | | | |
|---|---|---|---|
| 6,981,286 B2* | 1/2006 | Sallick | 4/675 |
| 7,698,755 B2* | 4/2010 | McNerney et al. | 4/695 |
| 2004/0231048 A1* | 11/2004 | Sallick | 4/695 |
| 2009/0276954 A1* | 11/2009 | Davidson | 4/695 |

\* cited by examiner

*Primary Examiner* — Huyen Le (57) ABSTRACT

A connecting structure for a faucet contains an inlet assembly including at least one intake and an outlet; the outlet including a connecting head; an outlet pipe including a locking loop; a nut fitted with the outlet pipe and screwed with the connecting head and including at least two outer contacting faces; a plastic housing including a chamber, a fitting opening, and a hole; the chamber including at least two inner contacting faces axially extending from an inner peripheral surface thereof, and at least one of the at least two inner contacting faces being a tangent plane, such that when the outlet pipe is inserted into the hole and the chamber to extend out of the fitting opening, the at least two inner contacting faces slide along the at least two outer contacting faces of the nut respectively and contact with the at least two outer contacting faces tightly.

12 Claims, 8 Drawing Sheets

CONNECTING STRUCTURE FOR A FAUCET

BACKGROUND OF THE INVENTION

1. Field of the Invention

The present invention relates to a connecting structure for a faucet.

2. Description of the Prior Art

To screw a nut with an inlet assembly of a conventional connecting structure for a faucet securely, the nut is made of metal, such as zinc alloy or cooper, but a top end of the nut is contacted and an outlet pipe is scraped easily. Moreover, if the nut is made of metal and formed in a hat shape, it is produced at a high cost.

A positioning device of a faucet disclosed in CN Patent No. CN2500882 Y contains a recess formed in a nut, and the recess includes a wear-proof loop fixed therein so that the nut is fitted with an outlet pipe by using the wear-proof loop to prevent the nut from being contacted and to prevent the outlet from being scraped.

However, such a nut is made of metal and formed in a hat shape to increase production cost.

To solve above-mentioned problem, a nut made of metal and integrally overmolded is widely used by plastic injection molding to lower its weight and production cost and to prevent the outlet pipe from scrape.

Nevertheless, the nut fixed in a mold will be moved by a pressure resulting from a plastic injection molding that can not be aligned with a plastic housing precisely, hence the plastic housing contacts with the outlet pipe tightly to be forced severely, having a deformation.

The metal nut can also be fixed on the plastic housing by ultrasonic welding, but the plastic housing can not be fixed on the same axial line as the metal nut. Also, the ultrasonic welding will generate a high temperature to deform the metal nut and the plastic housing easily.

In addition, if the plastic housing is overmolded or welded with the metal nut, they can not be removed solely, i.e., the plastic housing and the metal nut have to be replaced together to increase a replacement cost.

The present invention has arisen to mitigate and/or obviate the afore-described disadvantages.

SUMMARY OF THE INVENTION

The primary object of the present invention is to provide a connecting structure for a faucet which is capable of overcoming the shortcomings of the conventional connecting structure.

To obtain the above objectives, a connecting structure for a faucet provided by the present invention contains:

an inlet assembly fixed on a base and including at least one intake and an outlet to communicate with the at least one intake; the outlet including a connecting head formed thereon;

an outlet pipe closely positioned in the outlet of the inlet assembly and including a locking loop fitted on an outer peripheral surface of an inflow end thereof;

a nut fitted with the outlet pipe and screwed with the connecting head of the inlet assembly, such that the looking loop is locked on a top end of the connecting head to further fix the outlet pipe, and the nut including at least two outer contacting faces axially extending from an outer peripheral surface thereof, and at least one of the at least two outer contacting faces being a tangent plane;

a plastic housing formed in a hat shape and including a chamber disposed therein, a fitting opening fixed thereon and communicating with the chamber, and a hole to communicate with the chamber; the chamber including at least two inner contacting faces axially extending from an inner peripheral surface thereof, and at least one of the at least two inner contacting faces being a tangent plane, such that when the outlet pipe is inserted into the hole and the chamber to extend out of the fitting opening, the at least two inner contacting faces slide along the at least two outer contacting faces of the nut respectively and contact with the at least two outer contacting faces tightly; the at least two inner contacting faces are provided to contact with the at least two outer contacting faces tightly to form a contacting zone over a semi-circular area.

Thereby, the plastic housing formed in a hat shape and the nut contact with each other tightly, i.e., the inner contacting faces match with the outer contacting faces individually so that the plastic housing is connected with the nut on the same axial line to be further fitted on the outlet pipe precisely and to prevent from a deformation as it is forced.

The plastic housing is resiliently hooked with the nut so as to be replaced solely without replacing the nut simultaneously. Likewise, the plastic housing can not be produced by a plastic injection overmolding or ultrasonic welding to lower damage and production cost in a working process.

The plastic housing is made of plastic and is positioned on the same axial line as the nut to be connected with the outlet pipe precisely, hence the outlet pipe can not be scraped to have aesthetics appearance.

At least one inner contacting face of the plastic housing and at least one outer contacting face of the nut are formed in a tangent plane shape so that the plastic housing is limited to rotate on the nut to obtain a secure positioning.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-4, a connecting structure for a faucet 1 according to a first embodiment of the present invention comprises an inlet assembly 10, two controlling sets 20, an outlet pipe 30, a nut 40, a plastic housing 50, a retaining ring 60, a closing plate 70, and a covering member 80.

The inlet assembly 10 is a well-know structure and is fixed on a base a and formed in a H shape, the inlet assembly 10 includes two intakes 11 formed on two lower ends of two lower extensions thereof to flow cold water and hot water respectively, two grooves 12 fixed on two upper ends of two first upper extensions thereof to communicate with the two intakes 11 individually, and an outlet 13 fixed on a second upper extension thereof between the two second upper extensions to communicate with the two grooves 12; the outlet 13 includes a connecting head 131 formed thereon.

Each of the two controlling sets 20 includes a valve core 21 secured in the groove 12 of the inlet assembly 10, a handle 22 to operate the valve core 21 to flow the cold water and the hot water, such that the handle 22 is turned on and off to flow the cold water and the hot water flowing from the two intakes 11 to the outlet 13 to be mixed together, thus adjusting a mixed rate of the cold water and the hot water.

The outlet pipe 30 is closely positioned in the outlet 13 of the inlet assembly 10 and includes a locking loop 31 fitted on an outer peripheral surface of an inflow end thereof. In this embodiment, the outlet pipe 30 further includes two closing pads 32 secured on the outer peripheral surface of an inflow end thereof below the locking loop 31 to retain with an inner surface of the outlet 13.

Figure 5:
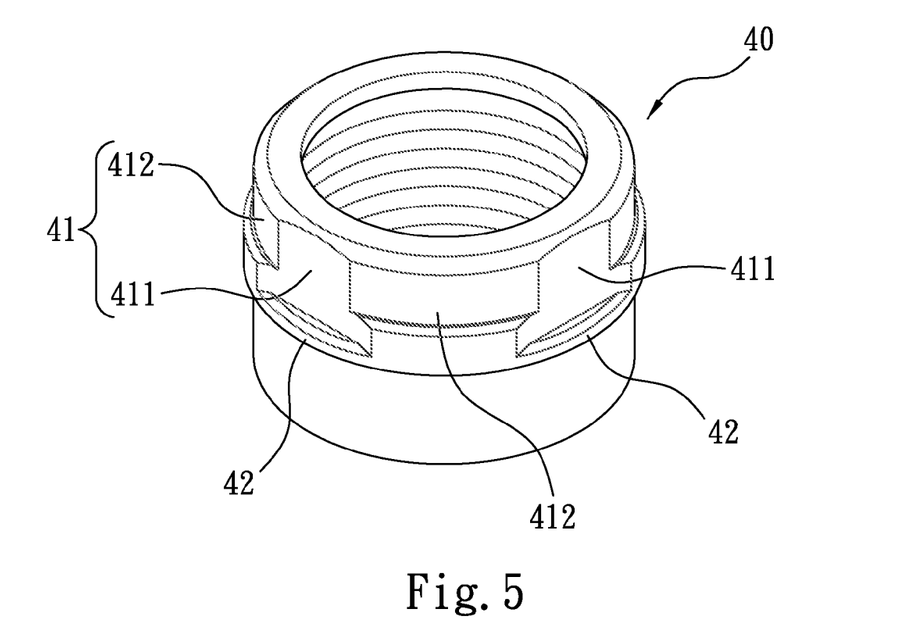
FIG. 5 is a perspective view showing the assembly of a nut of the connecting structure for the faucet according to the first embodiment of the present invention.
Figure 8:
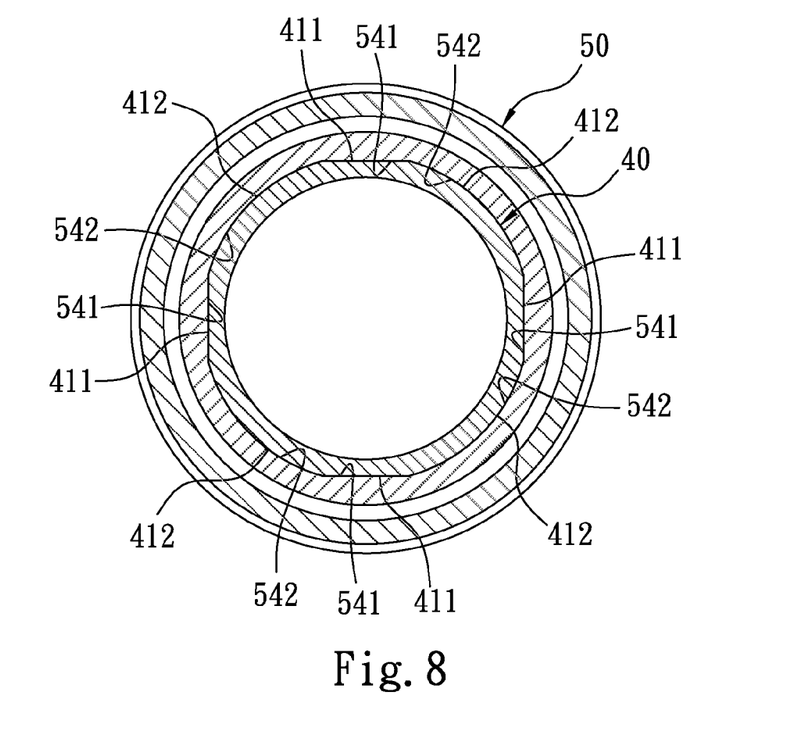
FIG. 8 is a cross sectional view taken along the line 2-2 of FIG. 7.

The nut 40, as shown in FIGS. 5 and 8, is fitted with the outlet pipe 30 and is screwed with the connecting head 131 of the inlet assembly 10, such that the looking loop 31 is locked on a top end of the connecting head 131 to further fix the outlet pipe 30; the nut 40 is capable of providing with eight outer contacting faces 41 axially extending from an outer peripheral surface thereof, wherein there are four first outer contacting faces 411 equiangularly arranged on the outer peripheral surface of the nut 40 and four second outer contacting faces 412 in this embodiment, wherein each second outer contacting face 412 is defined between any two adjacent first outer contacting faces 411, and each of the first outer contacting faces 411 is a tangent plane, and each of the second outer contacting faces 412 is a convex surface formed in an arc shape.

The nut 40 also includes at least one engaging rib 42 extending on the outer peripheral surface thereof in a circumferential direction, wherein there are four engaging ribs 42 equiangularly arranged on the outer peripheral surface of the nut 40 below the four first outer contacting faces 411 individually.

Figure 6:
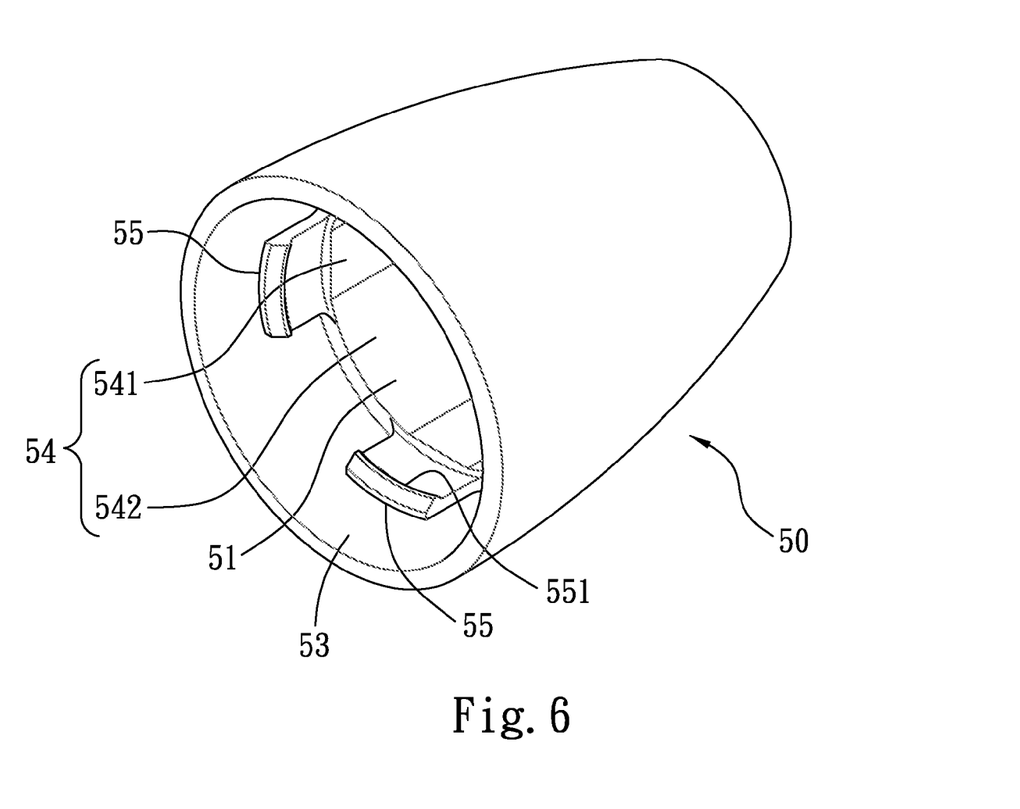
FIG. 6 is a perspective view showing the assembly of a plastic housing of the connecting structure for the faucet according to the first embodiment of the present invention.
Figure 7:
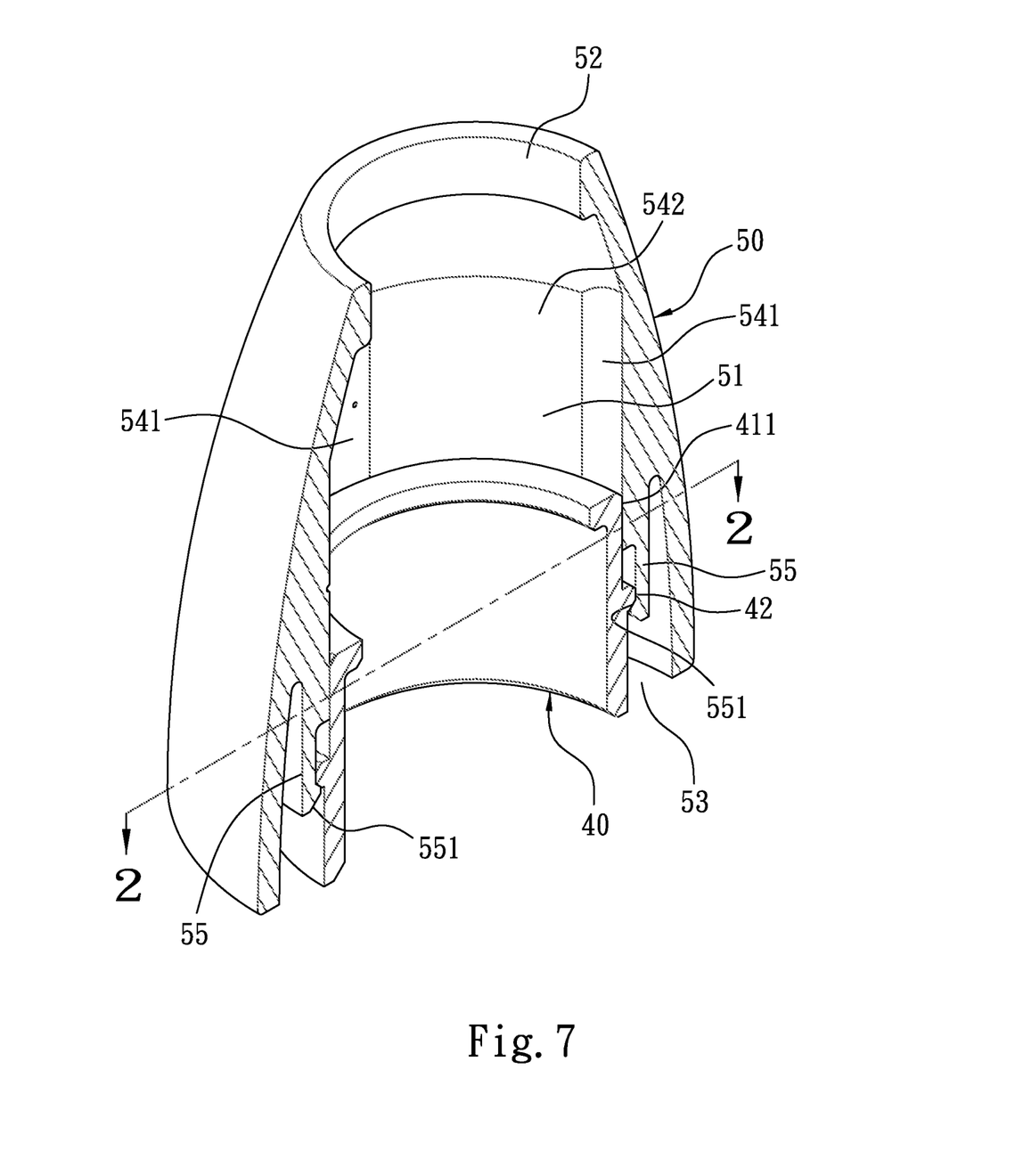
FIG. 7 is a cross-sectional perspective view showing the assembly of the plastic housing and the nut of the connecting structure for the faucet according to the first embodiment of the present invention.

The plastic housing 50, as illustrated in FIGS. 6-8, is formed in a hat shape and includes a chamber 51 disposed therein, a fitting opening 52 fixed thereon and communicating with the chamber 51, and a hole 53 to communicate with the chamber 51; the chamber 51 is capable of being provided with eight inner contacting faces 54 axially extending from an inner peripheral surface thereof, wherein there are four first inner contacting faces 541 equiangularly arranged on the inner peripheral surface of the nut 40 and four second inner contacting faces 542 in this embodiment, wherein each second inner contacting face 542 is defined between any two adjacent first inner contacting faces 541, and each first inner contacting face 541 is a tangent plane, and each second inner contacting face 542 is a concave surface formed in an arc shape. Thereby, when the outlet pipe 30 is inserted into the hole 53 and the chamber 51 to extend out of the fitting opening 52, the four first inner contacting faces 541 slide along the four first outer contacting faces 411 of the nut 40 respectively and contact with the four first outer contacting faces tightly 411; and the four second inner contacting faces 542 slide along the four second outer contacting faces 412 of the nut 40 individually and contact with the four second outer contacting faces 412 tightly so that the plastic housing 50 is fixed on an axial line the same as the nut 40 without disengagement and non-alignment.

To further prevent the plastic housing 50 from disengagement, at least one fastening paw 55 is provided on an inner peripheral surface of the chamber 51. In this embodiment, there are four fastening paws 55 equiangularly arranged on the inner peripheral surface of the chamber 51 and located below the four first inner contacting faces 541 respectively, and each fastening paw 55 includes a hook segment 551 formed on a distal end thereof to resiliently hook with each engaging rib 42 so that the plastic housing 50 is limited on the nut 40.

Figure 1:
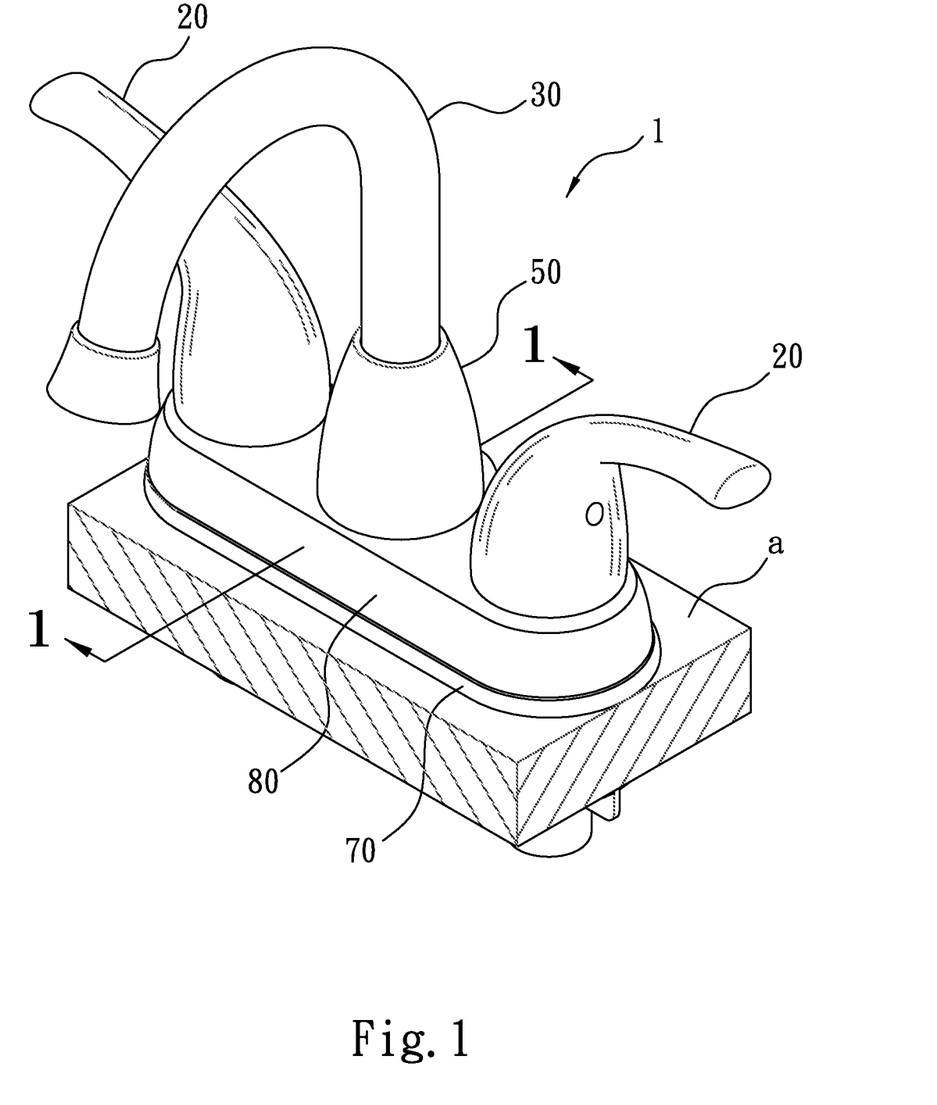
FIG. 1 is a perspective view showing the assembly of a connecting structure for a faucet according to a first embodiment of the present invention.
Figure 2:
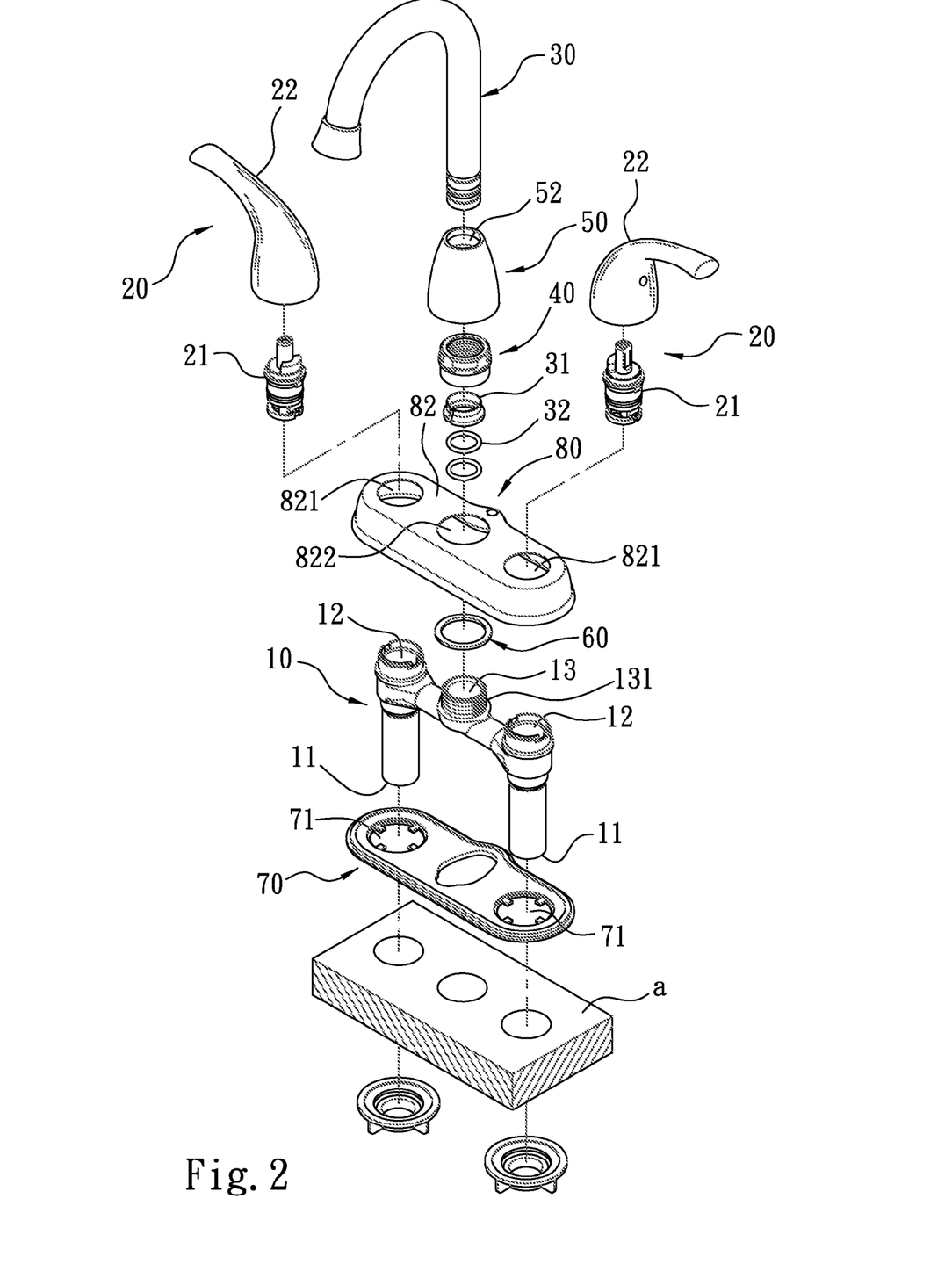
FIG. 2 is a perspective view showing the exploded components of the connecting structure for the faucet according to the first embodiment of the present invention.
Figure 3:
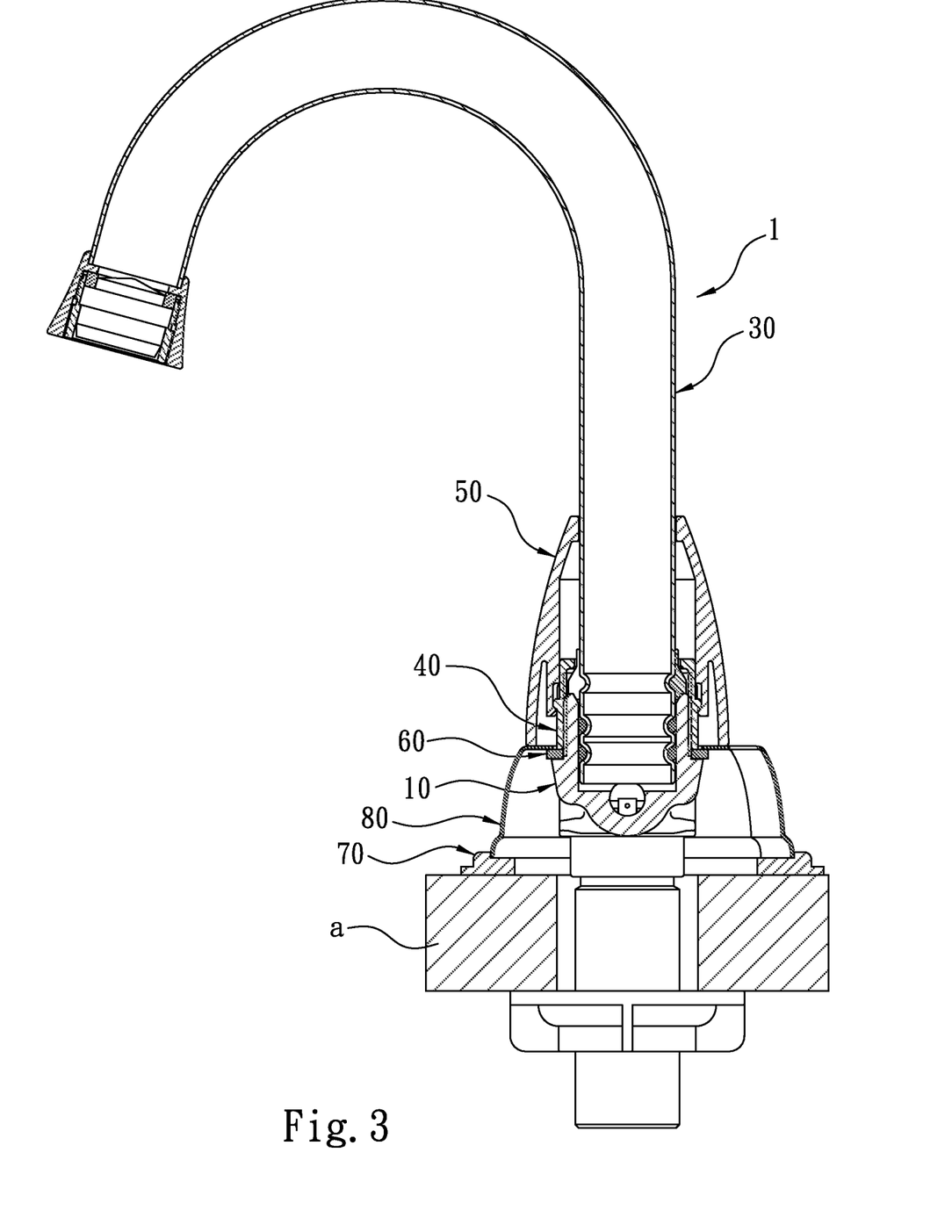
FIG. 3 is a cross sectional view taken along the line 1-1 of FIG. 1.
Figure 4:
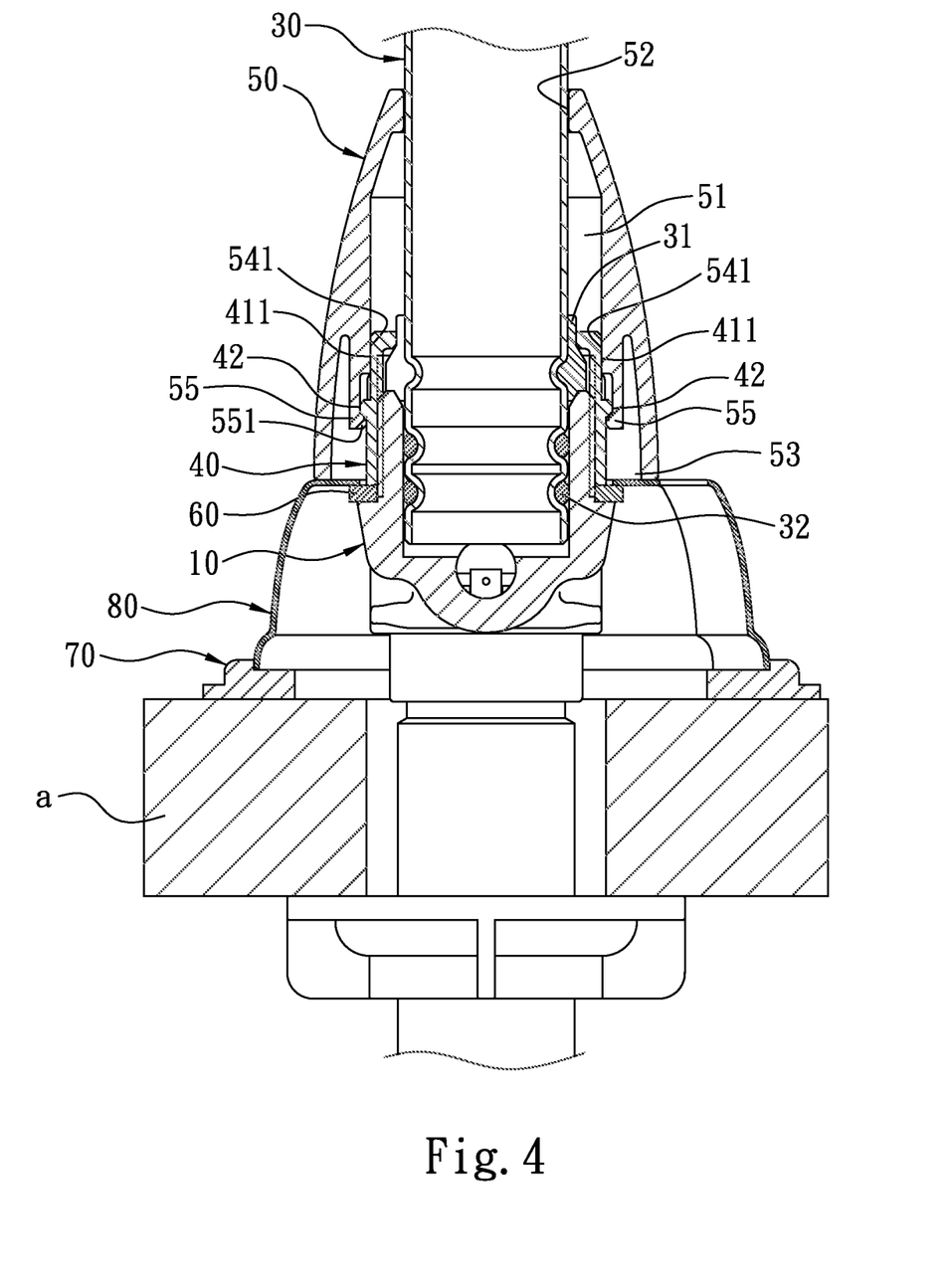
FIG. 4 is an amplified view of a part of FIG. 3.

The retaining ring 60 is served to fit on the connecting head 131 of the inlet assembly 10 and is retained between the nut 40 and the connecting head 131.

The closing plate 70 is used to abut against the base a and includes at least two orifices 71 disposed on two sides thereof individually to insert the two intakes 11 of the inlet assembly 10 respectively.

The covering member 80 is covered on the inlet assembly 10 and includes a bottom rim 81 to retain with the closing plate 70, a top wall 82 having two first apertures 821 and a second aperture 822 between the two first apertures 821; the two first apertures 821 are opposite to the two grooves 12 of the inlet assembly 10 individually; the second aperture 822 is provided to receive the nut 40; a certain portion of the top wall 82 of the covering member 80 around the second aperture 822 is positioned between a top surface of the retaining ring 60 and a bottom end of the plastic housing 50.

The eight inner contacting faces 54 of the plastic housing 50 tightly contact with the eight outer contacting faces 41 of the nut 40 individually to prevent the nut 40 from a horizontal non-alignment. However, a number of the inner contacting faces 54 and the outer contacting faces 41 are not limited. For example, at least two inner contacting faces 54 are provided to contact with at least two outer contacting faces 41 tightly to form a contacting zone over a semi-circular area, and at least one inner contacting face 54 to correspond to at least one outer contacting face 41 is formed in a tangent plane shape so as to prevent the nut 40 from the horizontal non-alignment as well.

Figure 9:
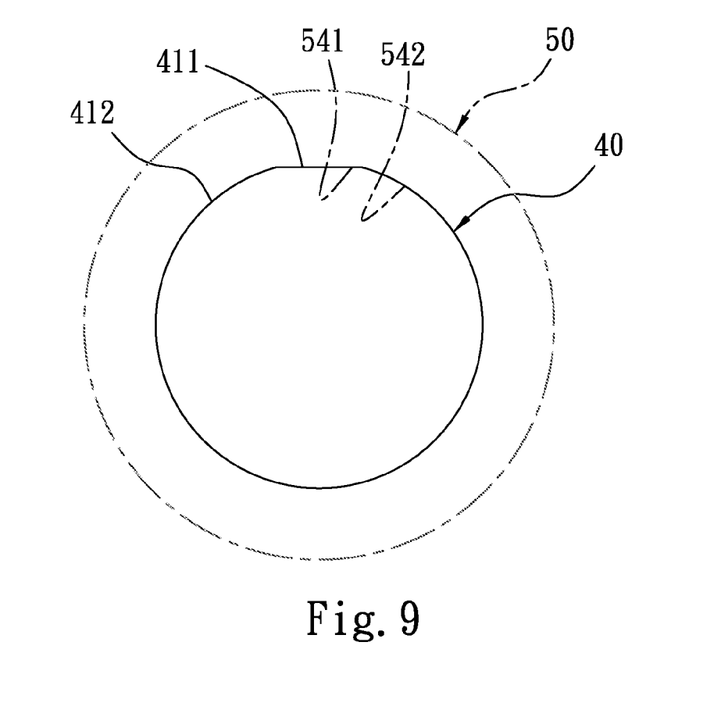
FIG. 9 is a plan view showing the assembly of a plastic housing and a nut of a connecting structure for the faucet according to a second embodiment of the present invention.

Referring to FIG. 9, a connecting structure for a faucet according to a second embodiment of the present invention comprises a nut 40, and the nut 40 includes a first outer contacting face 411 formed in a tangent plane shape and a second outer contacting face 412 formed in a convex arc shape; and a plastic housing 50 includes a first inner contacting face 541 formed in a tangent plane shape and a second inner contacting face 542 formed in a concave arc shape.

Figure 10:
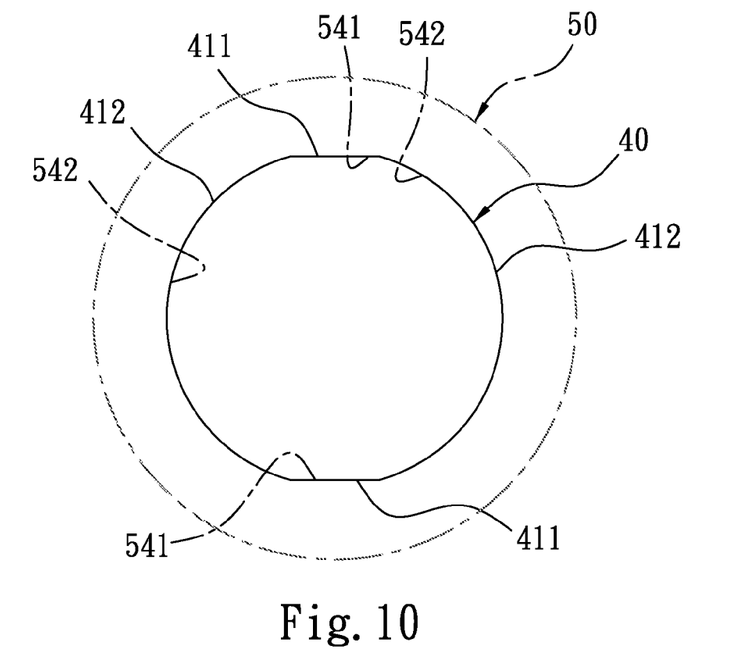
FIG. 10 is a plan view showing the assembly of a plastic housing and a nut of a connecting structure for the faucet according to a third embodiment of the present invention.

With reference to FIG. 10, a connecting structure for a faucet according to a third embodiment of the present invention comprises a nut 40, and the nut 40 includes two first outer contacting faces 411 formed in a tangent plane shape and two second outer contacting faces 412 formed in a convex arc shape; and a plastic housing 50 includes two first inner contacting faces 541 formed in a tangent plane shape and two second inner contacting faces 542 formed in a concave arc shape.

Figure 11:
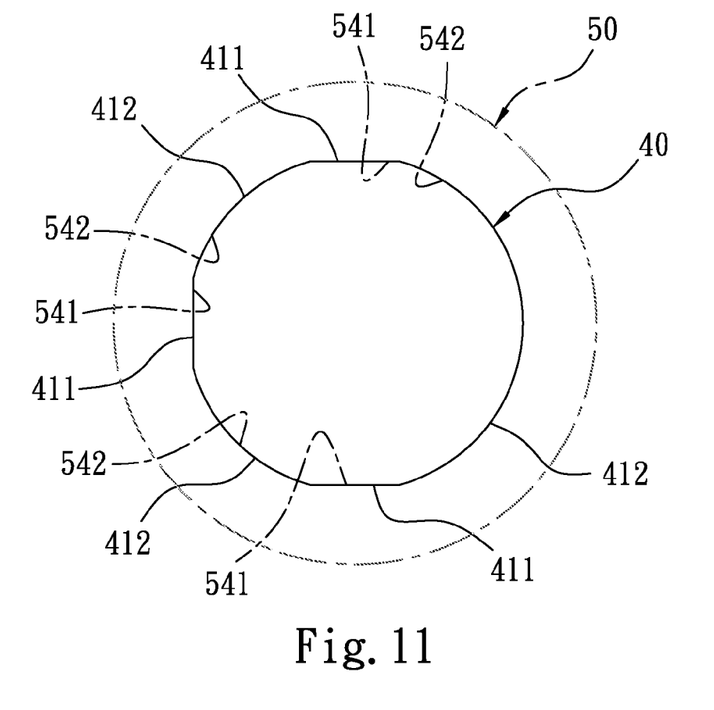
FIG. 11 is a plan view showing the assembly of a plastic housing and a nut of a connecting structure for the faucet according to a fourth embodiment of the present invention.

As shown FIG. 11, a connecting structure for a faucet according to a fourth embodiment of the present invention comprises a nut 40, and the nut 40 includes three first outer contacting faces 411 formed in a tangent plane shape and three second outer contacting faces 412 formed in a convex arc shape; and a plastic housing 50 includes three first inner contacting faces 541 formed in a tangent plane shape and two three inner contacting faces 542 formed in a concave arc shape.

Thereby, the plastic housing 50 formed in a hat shape and the nut 40 contact with each other tightly, i.e., the inner contacting faces 54 match with the outer contacting faces 41 individually so that the plastic housing 50 is connected with the nut 40 on the same axial line to be further fitted on the outlet pipe 30 precisely and to prevent from a deformation as it is forced.

The plastic housing 50 is resiliently hooked with the nut 40 so as to be replaced solely without replacing the nut 40 simultaneously. Likewise, the plastic housing 50 can not be produced by a plastic injection overmolding or ultrasonic welding to lower damage and production cost in a working process.

The plastic housing 50 is made of plastic and is positioned on the same axial line as the nut 40 to be connected with the outlet pipe 30 precisely, hence the outlet pipe 50 can not be scraped to have aesthetics appearance.

At least one inner contacting face 54 of the plastic housing 50 and at least one outer contacting face 41 of the nut 40 are formed in a tangent plane shape so that the plastic housing 50 is limited to rotate on the nut 40 to obtain a secure positioning.

While we have shown and described various embodiments in accordance with the present invention, it is clear to those skilled in the art that further embodiments may be made without departing from the scope of the present invention.

What is claimed is:

1. A connecting structure for a faucet comprising
an inlet assembly fixed on a base and including at least one intake and an outlet to communicate with the at least one intake; the outlet including a connecting head formed thereon;
an outlet pipe closely positioned in the outlet of the inlet assembly and including a locking loop fitted on an outer peripheral surface of an inflow end thereof;
a nut fitted with the outlet pipe and screwed with the connecting head of the inlet assembly, such that the looking loop is locked on a top end of the connecting head to further fix the outlet pipe, and the nut including at least two outer contacting faces axially extending from an outer peripheral surface thereof, and at least one of the at least two outer contacting faces being a tangent plane;
a plastic housing formed in a hat shape and including a chamber disposed therein, a fitting opening fixed thereon and communicating with the chamber, and a hole to communicate with the chamber; the chamber including at least two inner contacting faces axially extending from an inner peripheral surface thereof, and at least one of the at least two inner contacting faces being a tangent plane, such that when the outlet pipe is inserted into the hole and the chamber to extend out of the fitting opening, the at least two inner contacting faces slide along the at least two outer contacting faces of the nut respectively and contact with the at least two outer contacting faces tightly; the at least two inner contacting faces are provided to contact with the at least two outer contacting faces tightly to form a contacting zone over a semi-circular area.

2. The connecting structure for the faucet as claimed in claim 1, wherein the at least two outer contacting faces of the nut include at least one first outer contacting face formed in a tangent plane shape and at least one second outer contacting face being a convex surface formed in an arc shape; the at least two inner contacting faces of the plastic housing include at least one first inner contact face formed in a tangent plane shape and at least one second inner contacting face being a concave surface formed in an arc shape; the at least one first inner contacting face contacts with the at least one first outer contacting face tightly, and the at least one second inner contacting face contacts with the at least one second outer contacting face tightly.

3. The connecting structure for the faucet as claimed in claim 2, wherein the at least two outer contacting faces of the nut include four first outer contacting faces equiangularly arranged on the outer peripheral surface of the nut and four second outer contacting faces, wherein each second outer contacting face is defined between any two adjacent first outer contacting faces; the at least two inner contacting faces of the plastic housing include four first inner contacting faces equiangularly arranged on an outer peripheral surface of the plastic housing and four second inner contacting faces, wherein each second inner contacting face is defined between any two adjacent first inner contacting faces.

4. The connecting structure for the faucet as claimed in claim 1, wherein the nut also includes at least one engaging rib extending on the outer peripheral surface thereof in a circumferential direction; the plastic housing includes at least one fastening paw fixed on an inner peripheral surface of the chamber to resiliently hook with the at least one engaging rib so that the plastic housing is limited on the nut.

5. The connecting structure for the faucet as claimed in claim 4, wherein the at least one fastening paw includes a hook segment formed on a distal end thereof to resiliently hook with the at least one engaging rib.

6. The connecting structure for the faucet as claimed in claim 4, wherein the nut includes four engaging ribs equiangularly arranged on the outer peripheral surface thereof; the chamber of the plastic housing includes four fastening paws equiangularly arranged on the inner peripheral surface thereof to correspond to the four engaging ribs.

7. The connecting structure for the faucet as claimed in claim 2, wherein the nut includes at least two engaging ribs extending on the outer peripheral surface thereof in a circumferential direction, wherein the at least two engaging ribs are arranged on the outer peripheral surface of the nut below the at least two first outer contacting faces individually; the chamber of the plastic housing includes at least two fastening paws arranged on the inner peripheral surface thereof to resiliently hook with the at least two engaging ribs respectively so that the plastic housing is limited on the nut.

8. The connecting structure for the faucet as claimed in claim 7, wherein each of the at least two fastening paws includes a hook segment formed on a distal end thereof to resiliently hook with each of the at least two fastening paws.

9. The connecting structure for the faucet as claimed in claim 7, wherein the nut includes four engaging ribs equiangularly arranged on the outer peripheral surface thereof below the four first outer contacting faces individually; the chamber of the plastic housing includes four fastening paws equiangularly arranged on the inner peripheral surface thereof to correspond to the four engaging ribs.

10. The connecting structure for the faucet as claimed in claim 1, wherein the inlet assembly is formed in a H shape and includes two intakes formed on two lower ends of two lower extensions thereof, two grooves fixed on two upper ends of two first upper extensions thereof to communicate with the two intakes individually, and the outlet fixed on a second upper extension thereof between the two second upper extensions to communicate with the two grooves.

11. The connecting structure for the faucet as claimed in claim 10 further comprising two controlling sets secured in the two grooves of the inlet assembly individually.

12. The connecting structure for the faucet as claimed in claim 10 further comprising a retaining ring served to fit on the connecting head of the inlet assembly and being retained between the nut and the connecting head; a closing plate and a covering member; wherein the closing plate is used to abut against the base and includes at least two orifices disposed on two sides thereof individually to insert the two intakes of the inlet assembly respectively; the covering member is covered on the inlet assembly and includes a bottom rim to retain with the closing plate, a top wall having two first apertures and a second aperture between the two first apertures; the two first apertures are opposite to the two grooves of the inlet assembly individually; the second aperture is provided to receive the nut; a certain portion of the top wall of the covering member around the second aperture is positioned between a top surface of the retaining ring and a bottom end of the plastic housing.

\* \* \* \* \*